United States Patent Office 3,323,895
Patented June 6, 1967

3,323,895
DEFOLIATION PROCESS EMPLOYING 3-AMINO-3-CARBOXYPROPYL METHYL SULFOXIMINE HYDROGEN SULFATE
Bryant Leonidas Walworth, Pennington, N.J., assignor to American Cyanamid Company, Stamford, Conn., a corporation of Maine
No Drawing. Original application Sept. 27, 1963, Ser. No. 311,947. Divided and this application Sept. 2, 1965, Ser. No. 484,764
1 Claim. (Cl. 71—2.7)

This application is a divisional application of application Ser. No. 311,947, filed Sept. 27, 1963, now abandoned.

This invention relates to a method for defoliating plants. More particularly, it relates to a method for defoliating plants and in particular cotton plants with a specific compound and the salts thereof.

While numerous defoliants have been used successfully in the past, none are available which may be applied satisfactorily under a variety of conditions and for a large variety of purposes. Thus, of the compounds useful as defoliants, many are extremely selective, i.e., effective against a limited number of plant species and few are sufficiently water soluble to permit the preparation of simple dilutions in water.

Therefore, it is an object of this invention to provide a method for the defoliation of a large variety of plant species.

A further object of the present invention is to provide aqueous compositions for defoliation which are readily prepared by simple dilution in water of highly effective defoliants.

These and other objects and advantages of the present invention will become more apparent from the detailed description thereof set forth hereinbelow.

According to the present invention, a method is provided for defoliating plants which comprises applying to the undesirable foliage a defoliating amount of 3-amino-3-carboxypropyl methyl sulfoximine and the salts thereof.

Among the salts contemplated are the sulfate, nitrate, halide, such as the chloride, phosphate, acetate, propionate, butyrate, gluconate, ammonia, dimethylamine, diethylamine, alkanolamine such as ethanolamine, alkali metal salts such as the sodium or potassium salts and the alkaline earth metal salts such as calcium and magnesium salts. These salts and their equivalents may be prepared by conventional procedures as by introducing the sulfoximine into an aqueous medium and reacting it with the appropriate inorganic, organic, acid, amine, alkali metal or alkaline earth metal base. Illustratively, they may be prepared as follows:

PREPARATION OF SULFOXIMINE SALTS

*3-amino-3-carboxypropyl methyl sulfoximine hydrogen sulfate*

To 18 grams of methionine sulfoximine (0.1 mole) in 50 ml. of water is slowly added 10 ml. of concentrated sulfuric acid with stirring. The mixture is cooled to 0–5° C. and ethanol added to precipitate the crude 3-amino-3-carboxypropyl methyl sulfoximine hydrogen sulfate. This is recrystallized from water-ethanol mixtures to melting point 190–192° C.

*3-amino-3-carboxypropyl methyl sulfoximine dihydrogen phosphate*

To 50 cc. of 10% phosphoric acid is added 9.0 grams of methionine sulfoximine. The solution is concentrated under vacuum at 35° C. until a precipitate is observed; crystallization is completed by cooling to 5° C. The product is collected by filtration.

*3-amino-3-carboxypropyl methyl sulfoximine hydrochloride*

Five grams of methionine sulfoximine is dissolved in methanol. The solution is then saturated with dry hydrogen chloride. When the solvent is evaporated, 6.0 grams of the desired salt is recovered.

The following salts are illustrative of those which can be prepared in an analogous manner by substituting an equivalent of the appropriate acid in place of the hydrogen chloride:

3-amino-3-carboxypropyl methyl sulfoximine gluconate
3-amino-3-carboxypropyl methyl sulfoximine picrate The defoliating compositions usable in the process of this invention may be prepared by admixing the active 3-amino-3-carboxypropyl methyl sulfoximine compound, including salts thereof, with any of the inert liquid or solid carriers generally employed in the preparation of agricultural sprays, dusts or wettable powder formulations.

Liquid formulations may be prepared by dissolving the active compound in water and, if desired to increase active content of a composition, adding thereto from about .1 to 2% of a suitable surface active agent or emulsifying agent.

Dry formulations may be prepared by admixing the active component with an inert solid carrier such as attaclay, diatomaceous earth, talc, pumice, kaolin, fuller's earth, chalk, wood flour, silica, charcoal, activated carbon or other inert powders. In such formulations approximately 50 to 98% by weight of the composition is in the form of the inert carrier.

Wettable powder compositions may be prepared by blending an inert solid carrier such as those referred to above and in particular attaclay with an amount of a suitable emulsifying agent. The active compounds containing wettable carrier are then dispersed in appropriate quantities of water to provide the proper concentration of active ingredient for the proposed end use.

As defoliants, the compounds are employed in amounts of from between about ¼ pound to about 1 pound per acre.

In order that the present invention may be more clearly understood, the following examples are given primarily by way of illustration. No specific details or enumerations contained therein should be construed as limitations on the present invention except insofar as they appear in the appended claim. All parts and percentages are by weight unless otherwise specifically designated.

EXAMPLE 1

To illustrate the defoliating effectiveness of the compounds of the invention when applied to dicotyledonous plants, aqueous solutions containing from $\frac{1}{32}\%$ to 2.0%, by weight, of 3-amino-3-carboxypropyl methyl sulfoximine hydrogen sulfate and 0.1%, by weight, of sodium dioctylsulfosuccinate were prepared and applied to mature cotton plants. The plants were then placed in a greenhouse and attended to in the usual manner.

All test plants were examined daily and when noticeable changes occurred such changes were recorded.

The results provided below indicate that complete desiccation of mature plants such as cotton can be achieved at as little as 1.0% concentration of active ingredient, at lesser rates of application this compound is a true defoliant. In addition, regrowth of buds on treated plants was not observed.

Table I

| Percent concentration of 3-amino-3-carboxypropyl methyl sulfoximine hydrogen sulfate in water | Desiccant or Defoliant Activity |
|---|---|
| EXPERIMENT 1 | |
| 2% soln.[1] | Killed all leaves and petioles; "frozen." |
| 1% | Do. |
| 1/2% | Killed all leaves and petioles; a few "pulled off." |
| 1/4% | Killed all leaves and petioles; some "pulled off." |
| EXPERIMENT 2 | |
| 1% | 91% def. in 14 days; 100% in 24 days. |
| 1/4% | 52% def. in 14 days; 83% in 24 days. |
| 1/8% | 17% def. in 14 days; 53% in 24 days. |
| 1/16% | No def. in 24 days. |
| 1/32% | Do. |
| EXPERIMENT 3 | |
| With 0.1% of sodium salt of dioctyl sulfosuccinate as wetting agent added to the spray solution: | |
| 1% | 14% def. in 14 days; 64% in 17 days. |
| 1/8% | 52% def. in 14 days; 77% in 17 days. |
| 1/16% | 21% def. in 14 days; 62% in 17 days. |
| Without a wetting agent: | |
| 1% | 45% def. in 14 days; 93% in 17 days. |
| 1/8% | 73% def. in 14 days; 85% in 17 days. |
| 1/16% | 0% def. in 14 days; 0% in 17 days. |

[1] Rate of application: 2% soln.=~4 lb./acre; 1% soln.=~2 lb./acre, etc.

I claim:

A method for defoliating cotton plants which comprises applying to the foliage of cotton plants, a defoliating amount of 3-amino-3-carboxypropyl methyl sulfoximine hydrogen sulfate.

References Cited

UNITED STATES PATENTS 3,179,510   4/1965   Husted _____ 71—2.7

OTHER REFERENCES

Ahlgren et al.: Principles of Weed Control, John Wiley and Sons, Inc., New York, 1951, pages 267 to 277.

Chemical Abstract, vol. 53, column 15236 (a) and Subject Index, page 2721 (S), 1959.

LEWIS GOTTS, *Primary Examiner.*

JAMES O. THOMAS, JR., ELBERT L. ROBERTS,
*Examiners.*